United States Patent
Eger et al.

(10) Patent No.: US 9,283,863 B2
(45) Date of Patent: Mar. 15, 2016

(54) METHOD AND APPARATUS FOR PROVIDING ELECTRICAL ENERGY

(75) Inventors: Kolja Eger, Ottobrunn (DE); Alexander Kepka, Nuremberg (DE); Andreas Zwirlein, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 182 days.

(21) Appl. No.: 14/115,606

(22) PCT Filed: May 4, 2011

(86) PCT No.: PCT/EP2011/057114
§ 371 (c)(1),
(2), (4) Date: Nov. 4, 2013

(87) PCT Pub. No.: WO2012/149965
PCT Pub. Date: Nov. 8, 2012

(65) Prior Publication Data
US 2014/0084874 A1    Mar. 27, 2014

(51) Int. Cl.
*B60L 11/18* (2006.01)
*H02J 7/00* (2006.01)
(Continued)

(52) U.S. Cl.
CPC ......... *B60L 11/1844* (2013.01); *B60L 11/1816* (2013.01); *B60L 11/1824* (2013.01); *H02J 3/14* (2013.01); *H02J 7/0027* (2013.01); *H02J 7/0013* (2013.01); *H02J 13/0062* (2013.01);
(Continued)

(58) Field of Classification Search
CPC .......................... B60L 11/1844; H02J 7/0027

USPC .......................................................... 320/137
See application file for complete search history.

(56) References Cited

U.S. PATENT DOCUMENTS 4,153,936 A * 5/1979 Schmitz et al. ............... 700/296
5,583,419 A * 12/1996 Haller ............................. 322/8
(Continued)

FOREIGN PATENT DOCUMENTS

| CN | 201656511 | 11/2010 |
|---|---|---|
| JP | 2005-278257 | 10/2005 |

(Continued)

OTHER PUBLICATIONS

International Search Report for PCT/EP2011/057114 mailed Feb. 3, 2012.
(Continued)

*Primary Examiner* — Sun Lin
(74) *Attorney, Agent, or Firm* — Staas & Halsey LLP

(57) ABSTRACT

In a charging management system for electrical vehicles, a maximum charging current for a plurality of charging operations, e.g., for a plurality of charging stations and/or a plurality of electrical vehicles, is coordinated in a centralized or a decentralized manner while complying with predefined flexibly adjustable secondary conditions. The secondary conditions can include economic and/or technical stipulations. In addition to a centralized load management system, a decentralized load management facility carries out a load distribution via a master charging station or autonomously by each charging station itself. If the master charging station fails, a changeover is made to a backup master charging station. The method can be used, for example, in electrical mobility, in particular the electrification of individual traffic.

17 Claims, 3 Drawing Sheets

(51) Int. Cl.
*H02J 3/14* (2006.01)
*H02J 13/00* (2006.01)

(52) U.S. Cl.
CPC .......... *H02J13/0075* (2013.01); *Y02T 10/7005* (2013.01); *Y02T 10/7055* (2013.01); *Y02T 10/7094* (2013.01); *Y02T 90/121* (2013.01); *Y02T 90/14* (2013.01); *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | | | |
|---|---|---|---|---|
| 5,754,444 | A * | 5/1998 | Koford | 716/123 |
| 5,903,064 | A * | 5/1999 | Norberg | 307/40 |
| 6,046,513 | A * | 4/2000 | Jouper et al. | 307/31 |
| 7,420,293 | B2 * | 9/2008 | Donnelly et al. | 307/34 |
| 7,456,523 | B2 | 11/2008 | Kobayashi | |
| 8,106,627 | B1 * | 1/2012 | Rossi | 320/109 |
| 8,324,859 | B2 * | 12/2012 | Rossi | 320/109 |
| 8,766,595 | B2 * | 7/2014 | Gaul et al. | 320/109 |
| 8,781,809 | B2 * | 7/2014 | Bridges | 703/18 |
| 8,935,011 | B2 * | 1/2015 | Tischer | 700/295 |
| 2005/0043858 | A1 | 2/2005 | Gelman et al. | |
| 2005/0213272 | A1 | 9/2005 | Kobayashi | |
| 2010/0134067 | A1 | 6/2010 | Baxter et al. | |
| 2011/0204845 | A1 * | 8/2011 | Paparo et al. | 320/108 |
| 2012/0253567 | A1 * | 10/2012 | Levy et al. | 701/22 |
| 2013/0013232 | A1 * | 1/2013 | Parwal et al. | 702/60 |
| 2014/0058575 | A1 * | 2/2014 | Ashworth et al. | 700/297 |
| 2014/0084874 | A1 * | 3/2014 | Eger et al. | 320/137 |
| 2014/0203779 | A1 * | 7/2014 | Eger et al. | 320/109 |
| 2014/0225565 | A1 * | 8/2014 | Eger et al. | 320/109 |

FOREIGN PATENT DOCUMENTS

| | | |
|---|---|---|
| WO | 2010/120551 A1 | 10/2010 |
| WO | 2011/018270 A2 | 2/2011 |

OTHER PUBLICATIONS

D. Bertsekas et al.; "Data Networks", 2nd Edition, Prentice-Hall, 1992, pp. 527-528.
German Translation of Office Action dated Nov. 4, 2014 in corresponding Japanese Patent Application No. 2014-508695.
Office Action dated May 21, 2015 in corresponding Chinese Patent Application No. 201180070631.5.

* cited by examiner

METHOD AND APPARATUS FOR PROVIDING ELECTRICAL ENERGY

CROSS REFERENCE TO RELATED APPLICATIONS

This application is the U.S. national stage of International Application No. PCT/EP2011/05114, filed May 4, 2011 and claims the benefit thereof. The application is incorporated by reference herein in its entirety.

BACKGROUND

Described below are a method and an apparatus for providing electrical energy.

An infrastructure which enables charging of electric vehicles from an electrical grid is necessary for electromobility. For this purpose, charging stations are provided, to which the electric vehicles can be connected for charging. Furthermore, there are additional components or functions for the authentication of, billing for or monitoring of the charging operations.

It is difficult to distribute the available electrical energy efficiently and fairly in the case of a multiplicity of charging operations which are initiated at different times. A further problem involves maintaining preset conditions in such a load distribution situation, for example "charging with ecological electricity" or capacity limits for charging stations, lines or transformers.

SUMMARY

Described below is a method of avoiding the above-mentioned disadvantages and in particular specifying an efficient and fair load management for charging electric vehicles.

In the method for providing electrical energy,
at least one charging station communicates a status change to a charging system;
the charging system determines a load distribution and communicates this to the (at least one) charging station; and
the (at least one) charging station provides the electrical energy in accordance with the communicated load distribution.

The charging system may be a hardware component and/or a software functionality. The charging system can be implemented on different units as software functionality. In particular, the charging system can be part of the charging station or part of another charging station or part of a central component.

The proposed approach therefore enables load management for a charging system including, for example, a plurality of charging stations, which are part of a publicly available electric recharging point, for example. The load management determines a load distribution whilst maintaining various conditions which can be both economic and technical (network-related) in nature. For example, network bottlenecks can thus be avoided and, at the same time, it is possible to ensure that a charging operation is performed with an ecological electricity (i.e., for example, electricity which originates from renewable energy sources).

In order to adhere to the conditions, the load management can regulate the maximum charging current or the maximum power consumption at the individual charging stations and thus guarantees a form of fairness between the charging operations (whilst also maintaining priorities or adhering to contractual provisions, for example).

The central load management can make presets corresponding to the charging stations either directly or with the aid of other components in the overall system and obtain status values from these presets.

The centralized approach has the advantage that central authentication can be provided in a simple manner. A further advantage is that information on the type of contract with the customer which is not stored on a card used for charging, for example, can be present in the central entity and be used correspondingly.

Furthermore, decentralized load management is proposed which can use the same methods for determining the load distribution as the central load management, but does not require an operation center or management system. The load management is implemented in a decentralized manner, i.e. the charging operations or charging stations are organized independently. A central component may be used for initial adjustment or parameterization of the charging stations or charging operations.

A development is that the load distribution is determined on the basis of at least one secondary condition and/or a number of connected or active charging stations.

Another development is that the secondary condition includes at least one of the following presets:
a preset maximum permissible capacity;
a weighting factor or a prioritization;
a maximum permissible charging current, in particular per charging operation or per base station or per electric vehicle.

In particular, a development is that the maximum permissible capacity includes at least one of the following possibilities:
a preset maximum permissible capacity of the charging station;
a preset maximum permissible capacity of a cable;
a preset maximum permissible capacity of a transformer;
a predetermined maximum permissible capacity of a distribution substation;
a preset maximum permissible capacity in accordance with an agreement or contract;
a preset maximum permissible capacity of an electric vehicle;
a preset maximum permissible capacity of an energy source;
a preset maximum permissible capacity of a virtual power plant (aggregation of a multiplicity of energy sources).

Another development is that the charging system is a central charging system.

In addition, a development is that the charging system is provided by a master charging station.

In the context of an additional development, the master charging station is detected using an identification.

For example, the charging station with the lowest identification value can be selected as master charging station.

Another development is that a configuration or a parameterization of the charging station is implemented using a central component.

One configuration is that at least one backup master charging station is determined (for example in advance).

The at least one backup master charging station can be determined using its identification. For example, the charging station with the second lowest identification is the first backup master charging station, and so on.

An alternative embodiment is that the master charging station communicates any status change to the at least one backup master charging station, and the at least one backup master charging station determines the load distribution on the basis of the status changes.

Another configuration is that the master charging station communicates the determined load distribution to the at least one backup master base station.

Thus, any of the backup master charging stations is capable of replacing the master station on the basis of the load distribution available locally at the backup master charging station. It is also possible for the master charging station to communicate the information on the present load distribution to the at least one backup master charging station, for example at preset times or on request.

Another configuration is that, in the event of a failure of the master charging station, the next backup master charging station is activated or activates itself.

A development is that a reactivated former master charging station is initially not used again as master charging station.

This can be ensured, for example, by virtue of the identification of the former master charging station being modified correspondingly such that it does not meet the criterion for the selection as master charging station. For example, the identification can be supplemented by a version number for this purpose.

An additional configuration is that the charging system is provided decentralized from each charging station, wherein the electrical energy from the charging station is adjusted on the basis of information or messages from other charging stations as well. This approach is also referred to as "gossiping method" and is particularly suitable for large networks in which central processing is excessively complex. The coordination takes place without a central charging system, and the charging stations can exchange messages with one another as a peer-to-peer (P2P) network, wherein, on the basis of such messages, for example, various estimated values are determined relating to an energy consumption in the P2P network, for example. On the basis of these estimated values, a load management component of the charging station makes a decision in respect of the adjustment of the charging current.

Another configuration is that at least one electric vehicle (or at least one battery of the electric vehicle) is charged using the electrical energy provided.

Also described below is an apparatus for providing electrical energy, having a processing unit, which is designed such that a status change can be communicated to a charging system;
wherein a load distribution ascertained by the charging system is received or in particular provided locally;
the electrical energy can be provided in accordance with the load distribution.

The charging system can be a hardware component or a function (for example in the form of software) which can be part of the apparatus, part of a (another) charging station or part of a central unit.

The processing unit can in particular be a processor unit and/or an at least partially hard-wired or logic circuit arrangement, which is designed, for example, in such a way that the method as described herein can be implemented. The processing unit can include any type of processor or computation unit or computer with correspondingly required peripherals (memory, input/output interfaces, input/output devices, etc.).

The above explanations relating to the method apply correspondingly to the apparatus. The apparatus can be implemented in a component or distributed in a plurality of components. In particular, part of the apparatus can also be connected via a network interface (for example the Internet).

One development is that the apparatus is in the form of a charging station, in particular for charging an electric vehicle.

BRIEF DESCRIPTION OF THE DRAWINGS

These and other aspects and advantages will become more apparent and more readily appreciated from the following description of the exemplary embodiments, with reference to the accompanying drawings of which.

DETAILED DESCRIPTION OF THE PREFERRED EMBODIMENT

Figure 1:
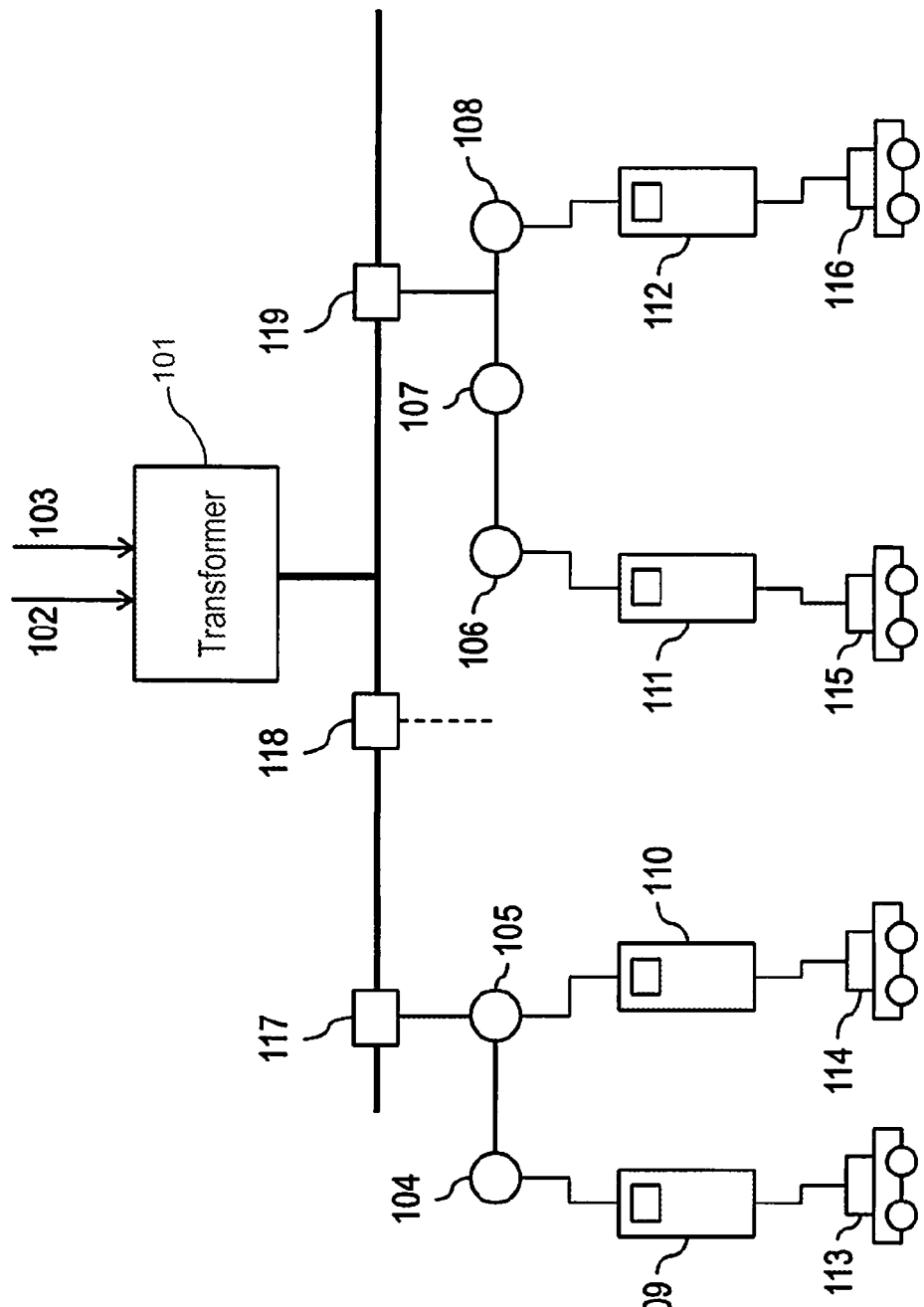
FIG. 1 is a schematic diagram illustrating the charging of electric vehicles via an energy grid.

Reference will now be made in detail to the preferred embodiments, examples of which are illustrated in the accompanying drawings, wherein like reference numerals refer to like elements throughout.

It is proposed to optimize a load distribution, i.e. to provide efficient and/or fair load distribution, for example, and in the process in particular to adhere to various boundary conditions. At least one of the following provisos is considered as boundary conditions, for example:

each charging session can be assigned to a group or a plurality of groups based on an ID (also referred to as identification) of a charging device (for example a charging station) and for example on the basis of a type of contract with a user or a vehicle to be charged;
a capacity, for example a charging capacity, can be preset or determined in another way for a group;
limitation of a charging current can be preset for a charging operation or for each charging operation;
each charging operation can be supplied with a basic charging current or a minimum charging current, for example;
a weighting factor in respect of a prioritization of the charging operation can be determined for each charging operation.

A distribution substation has, for example, a multiplicity of feeders to the low-voltage grid with a multiplicity of connection points via which, for example, a charging operation of a vehicle can take place by a charging station. A distribution substation is connected to an energy grid on the medium-voltage level via (at least) one transformer. The transformer provides a preset maximum charging capacity. This maximum charging capacity is intended to be maintained by the connection points. Furthermore, the energy grid can provide different types of electricity via the transformer, for example favorable electricity and ecologically obtained electricity (referred to below as "ecological electricity"). The types of electricity can be linked with different prices. For example, a customer proviso may be that the charging operation should be implemented up to x % (where x=0 . . . 100) with ecological electricity. This can be contractually regulated, for example, and taken into consideration correspondingly in the charging operation. It is also possible to treat this proviso as a desire and if the desire cannot be met to deviate to an alternative (in this case favorable electricity, for example). To this extent, a customer can be assigned to a group, for example, which performs charging operations with ecological electricity (the type of contract can be linked with the group affiliation).

FIG. 1 shows a transformer 101 which can be supplied ecological electricity 102 and favorable electricity 103 from an energy grid. The transformer 101 is part of a distribution substation, for example.

The transformer 101 is connected to three feeders 117, 118 and 119 via a line. The feeder 117 is connected to a charging station 109 via a connection point 104, at which charging station an electric vehicle 113 is charged. The feeder 117 is furthermore connected to a charging station 110 via a connection point 105, at which charging station an electric vehicle 114 is charged. For example, in addition, the feeder 119 is connected to the connection points 106 to 108, wherein the connection point 106 is connected to a charging station 111 at which an electric vehicle 115 is charged, and wherein the connection point 108 is connected to a charging station 112 at which an electric vehicle 116 is charged.

For example, both the transformer 101 in the distribution substation and each of the feeders 117 to 119 provide a maximum capacity which should not be exceeded.

In a (central or decentralized) charging system, an identification (ID) is managed for each charging operation. The charging operation for an electric vehicle also has a maximum permissible charging current $I^{MAX}$. This maximum permissible charging current arises as, for example, a minimum of the variables limiting the charging operation: for example the maximum charging current is limited by

- a maximum permissible charging capacity of the cable between the electric vehicle and the charging station,
- a maximum permissible charging capacity of the charging station,
- a maximum permissible charging capacity of the cable between the charging station and the feeder.

The lowest of the maximum permissible charging capacities (ostensibly: the weakest link in the chain) is a critical factor for the maximum permissible charging current $I^{MAX}$.

A (temporally limited) charging operation may be associated precisely with a contract. The contract indicates whether, for example, ecological electricity or favorable electricity is intended to be used. Combinations of types of electricity are also possible. Mention is additionally made of the fact that, in the example, a distinction is made between only two types of electricity, for reasons of clarity. Correspondingly, many different types of electricity, for example from different providers, possibly with different prices, are possible. A contingent in relation to the maximum permissible charging capacity can be linked with a contract.

The charging system can maintain a profile per group and day, for example a multiplicity of values can be provided or preset per unit time (for example 96 quarter-hour values per day).

An example will be illustrated below in respect of FIG. 1:

The electric vehicle 113 is given an identification ID1 for the charging operation, the electric vehicle 114 is given an identification ID2 for the charging operation, the electric vehicle 115 is given an identification ID3 for the charging operation, and the electric vehicle 116 is given an identification ID4 for the charging operation. The electric vehicles 113 and 115 with the identifications ID1 and ID3 are intended to be charged with ecological electricity 102, and the electric vehicles 114 and 116 with the identifications ID2 and ID4 are intended to be charged with favorable electricity 103.

Therefore, the following groups result, by way of example:

group $G_{ec}$, which is/is intended to be charged with ecological electricity:

$G_{ec}=\{1,3\}$;

group $G_{fav}$, which is/is intended to be charged with the favorable electricity:

Gfav=\{2, 4\};

group $G_{feed1}$, which is/is intended to be charged at the feeder 117:

$G_{feed1}=\{1,2\}$;

group $G_{feed2}$, which is/is intended to be charged at the feeder 118:

$G_{feed2}=\{\ \}$;

group $G_{feed3}$, which is/is intended to be charged at the feeder 119:

$G_{feed3}=\{3,4\}$;

group $G_{trans}$, which is (intended to be) charged at the transformer:

$G_{trans}=\{1,2,3,4\}$.

The braces {...} contain the identifications for the electric vehicles 113 to 116 affected for the respective group. Alternatively, it is likewise possible to denote the identifications ID1 to ID4 as identifications for the charging operations.

Each group or a selection of groups has a capacity restriction $C_{group}$, for example.

By way of example, a central or else decentralized (see further below in this regard) charging system (also referred to as "load management") will be described below taking into consideration a corresponding load distribution, for example. The load distribution may be performed taking into consideration preset secondary conditions. The charging system ascertains, for example, a parameter $I^{target}$, which determines the maximum power consumption (electricity) per charging operation or charging station. The charging system can be operated, for example, in accordance with or on the basis of the standard IEC 61851.

By way of example, the charging system can include an interface which provides the following functions (for example realized as function callup):

energyRequest( ) communication to the load management in respect of a further (new) charging operation;

sessionEnd( ) end of a charging operation;

session Update( ) updating of status values of a charging operation;

energySet( ) setting of the parameter $I^{target}$ as a setpoint value for the charging system.

Mention is made here of the fact that the charging operation can also be referred to as a "session".

An exemplary approach will be explained below which enables efficient and fair distribution of the total capacity by virtue of the control of the parameter $I^{target}$, for example.

Fair Load Distribution of the Total Capacity

In this scenario, a total capacity C is preset. Furthermore, there is only one single group and the number of charging operations n is known. The setpoint value $I^{target}$ for the load distribution is given as follows:

$$I^{target} = \frac{C}{n}$$

The load distribution can be implemented as follows:

(a) A charging station informs the (central) charging system of a status change, for example by the above-mentioned functions energyRequest( ), sessionEnd( ), session Update( ).

(b) Subsequently, the charging system ascertains a load distribution for each status change and communicates this to the charging station(s).

Fair Weighted Load Distribution

In this scenario, too, the total capacity C is preset, there is only a single group, and the number of charging operations n is known. For a charging operation s∈S a weighting factor $w_s$ is defined for prioritization. The load distribution can be determined in the form of a vector $$I^{target}=(I_s^{target}, s \in S).$$

The setpoint value for the load distribution $I_s^{target}$ per charging operation results as follows:

$$I_s^{target} = \frac{w_s \cdot C}{\sum_{s \in S} w_s} \forall s \in S$$

The load distribution is performed similarly to the scenario explained above "Fair load distribution of the total capacity".

Example

With a total capacity C=100 and n=10 charging operations and a weighting of the 10 charging operations in accordance with the following vector w, the load distribution vector $I^{target}$ follows from this:

$$w = \begin{bmatrix} 3 \\ 1 \\ 3 \\ 2 \\ 3 \\ 2 \\ 3 \\ 2 \\ 1 \\ 1 \end{bmatrix} \Rightarrow I^{target} = \begin{bmatrix} 14.2857 \\ 4.7619 \\ 14.2857 \\ 9.5238 \\ 14.2857 \\ 9.5238 \\ 14.2857 \\ 9.5238 \\ 4.7619 \\ 4.7619 \end{bmatrix}$$

Fair Load Distribution with Two Secondary Conditions

In this scenario, too, the total capacity C is preset, there is only a single group, and the number of charging operations n is known. The charging current can be limited for each charging operation s individual to a maximum charging current $I^{max}$:

$$I^{MAX} = (I_s^{MAX}, s \in S)$$

The load distribution can take place, for example, by a so-called "max-min flow control" method (cf.: D. Bertsekas, R. Gallager: "Data Networks", 2nd Edition, Prentice-Hall, 1992, pages 527, 528).

Example

With a total capacity C=100 and n=10 charging operations and limitation of the charging current per charging operation, a load distribution vector $I^{target}$ results from this:

$$I^{MAX} = \begin{bmatrix} 6 \\ 6 \\ 2 \\ 2 \\ 17 \\ 5 \\ 22 \\ 5 \\ 5 \\ 25 \end{bmatrix} \Rightarrow I^{target} = \begin{bmatrix} 6 \\ 6 \\ 2 \\ 2 \\ 17 \\ 5 \\ 22 \\ 5 \\ 5 \\ 25 \end{bmatrix}$$

Fair Weighted and Proportional Load Distribution

Each charging operation can be assigned to different groups by an identification of the charging station and by a type of contract. A maximum capacity $C_{groupID}$ can be defined for each group. The charging current can be limited for each charging operation in accordance with the relationship $$I^{MAX} = (I_s^{MAX}, s \in S)$$

Furthermore, it is possible to determine that each charging station receives at least one basic current $I^{basic}$. A weighting factor $w_s$ for a prioritization is defined for a charging operation s∈S.

The following maximization problem thus results:

$$\max \sum_{s \in S} w_s \log(I_s^{target}),$$

with the secondary conditions:

$$R \cdot I^{target} \leq C,$$

$$I_s^{target} \geq I^{basic},$$

where R is a matrix with the charging operations and the capacity limitations thereof, C is a vector with all of the capacity limitations, and $I^{target}$ is the load distribution vector.

Instead of the logarithm function, any desired concave function can be used.

Example

On the basis of the example shown in FIG. 1, six further charging operations are also provided in addition to the four charging operations illustrated. In total, there are therefore n=10 charging operations. In addition, the following maximum capacities are preset:

for the ecological electricity: $C_{ec}$=45;
for the favorable electricity: $C_{fav}$=200;
for the transformer $C_{trans}$=100;
for the feeder 117: $C_{feed1}$=40;
for the feeder 118: $C_{feed2}$=100;
for the feeder 119: $C_{feed3}$=100.

The following maximum charging currents are preset for the charging operations 1 to 10:

$$I^{MAX} = \begin{bmatrix} 100 \\ 10 \\ 10 \\ 100 \\ 10 \\ 10 \\ 100 \\ 100 \\ 10 \\ 10 \end{bmatrix}$$

$I^{basic}$=6 is preset as minimum current per charging operation.

The matrix R results from this:

$$R = \begin{bmatrix} \text{unit matrix, dimension } n \\ R_{feed1} \\ R_{feed2} \\ R_{feed3} \\ R_{trans} \\ R_{ec} \\ R_{fav} \end{bmatrix} = \begin{bmatrix} 1 & 0 & 0 & 0 & 0 & 0 & 0 & 0 & 0 & 0 \\ 0 & 1 & 0 & 0 & 0 & 0 & 0 & 0 & 0 & 0 \\ 0 & 0 & 1 & 0 & 0 & 0 & 0 & 0 & 0 & 0 \\ 0 & 0 & 0 & 1 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \\ 1 & 1 & 1 & 1 & 1 & 0 & 0 & 0 & 0 & 0 \\ 0 & 0 & 0 & 0 & 0 & 0 & 0 & 0 & 0 & 0 \\ 0 & 0 & 0 & 0 & 0 & 1 & 1 & 1 & 1 & 1 \\ 1 & 1 & 1 & 1 & 1 & 1 & 1 & 1 & 1 & 1 \\ 1 & 0 & 1 & 0 & 1 & 0 & 1 & 0 & 1 & 0 \\ 0 & 1 & 0 & 1 & 0 & 1 & 0 & 1 & 0 & 1 \end{bmatrix}$$

where the columns in the matrix R characterize the charging operations 1 to 10. The vector $R_{feed1}$ indicates that the charging operations 1 to 5 are supplied from the feeder 117, the vector $R_{feed3}$ indicates that the charging operations 6 to 10 are supplied from the feeder 119. The feeder 118 in this example does not provide a supply for any charging operation. The vector $R_{trans}$ indicates that the transformer 101 supplies all charging operations 1 to 10. The vector $R_{ec}$ indicates that the charging operations 1, 3, 5, 7 and 9 are implemented with ecological electricity and the vector $R_{fav}$ indicates that the charging operations 2, 4, 6, 8 and 10 are implemented with favorable electricity.

The vector C results as follows:

$$C^T = \begin{bmatrix} I^{MAX} \\ C_{feed1} \\ C_{feed2} \\ C_{feed3} \\ C_{trans} \\ C_{ec} \\ C_{fav} \end{bmatrix} = \begin{bmatrix} 100 \\ 10 \\ 10 \\ 100 \\ 10 \\ 10 \\ 100 \\ 100 \\ 10 \\ 10 \\ 40 \\ 100 \\ 100 \\ 100 \\ 45 \\ 200 \end{bmatrix}$$

The following results from this for the load distribution vector:

$$I^{target} = \begin{bmatrix} 7.4424 \\ 8.8365 \\ 7.4424 \\ 8.8365 \\ 7.4424 \\ 10.0000 \\ 12.6729 \\ 17.3271 \\ 10.0000 \\ 10.0000 \end{bmatrix}$$

In this example, the limiting secondary conditions are the maximum permissible currents for the charging operations 6, 9 and 10, the maximum permissible capacity of the feeder 117 ($C_{feed1}=40$), the maximum permissible capacity of the transformer 101 ($C_{trans}=100$) and the maximum permissible (or possible) ecological electricity ($C_{ec}=45$).

In addition, it is also possible for the individual charging operations to additionally be provided prioritization by the weighting factor $w_s$. This prioritization can be taken into consideration when determining the load distribution vector in addition to the abovementioned presets:

$$w = \begin{bmatrix} 1 \\ 2 \\ 3 \\ 4 \\ 5 \\ 6 \\ 7 \\ 8 \\ 9 \\ 10 \end{bmatrix} \Rightarrow I^{target} = \begin{bmatrix} 6.0000 \\ 6.0000 \\ 6.0000 \\ 9.6675 \\ 9.5824 \\ 10.0000 \\ 13.4176 \\ 19.3325 \\ 10.0000 \\ 10.0000 \end{bmatrix}$$

An advantage of the approach proposed here is that a maximum charging current for a plurality of charging operations, for example for a plurality of charging stations and/or electric vehicles, can be coordinated centrally or in a decentralized manner whilst maintaining preset, multiply adjustable secondary conditions. The secondary conditions can include economic presets and/or technical presets.

Example

Decentralized Load Management

The decentralized load management can be performed in a variety of ways. By way of example, two possibilities will be explained below.

(1) Selection of a Master:

In this case, the charging stations or the charging operations, which are functions which can be executed in a component, for example, can select a master which ascertains the load distribution. It is assumed by way of example in the text which follows that a plurality of charging stations act and organize themselves as peers (communicating components or functions). This approach is likewise possible for functions (for example charging operations) which can be executed on one or more components.

If the master fails, this is identified by the other charging stations, and a new master is determined. This approach has the advantage that the load management does not need to be adapted for the decentralized approach, but can be taken over from the central load management without any changes. The complexity which results from a decentralized implementation is outside of the load management component and can be provided by other components.

(2) Communication without a Master (Also Referred to as "Gossiping Method"):

In this case, coordination is implemented without any central entity. The charging stations form a peer-to-peer (P2P) network and communicate with other charging stations (peers), which are selected randomly (or pseudo-randomly) or in accordance with a preset scheme, for example.

In this case, various estimated values can be ascertained, for example from the present total consumption in the P2P network. On the basis of these estimated values, a load management component of the charging station autonomously decides in respect of the charging current $I^{target}$ to be preset. In the gossiping method, the load management is implemented in distributed form (for example by a distributed algorithm). This needs to be implemented again for each algorithm.

The gossiping method is suitable for large networks in which a central processing is excessively complex or the coordination of a central processing on its own would result in a high traffic load.

The approach (1) "Selection of a master" will be described in more detail below. Primarily for a small number of charging stations (for example approximately 32), the processing complexity for the master is uncritical and does not impair the performance of the components.

It is advantageous here that deterministic load management can be achieved in which there are no fluctuations as a result of convergence.

Example of a Decentralized Load Management with "Selection of a Master"

Figure 2:
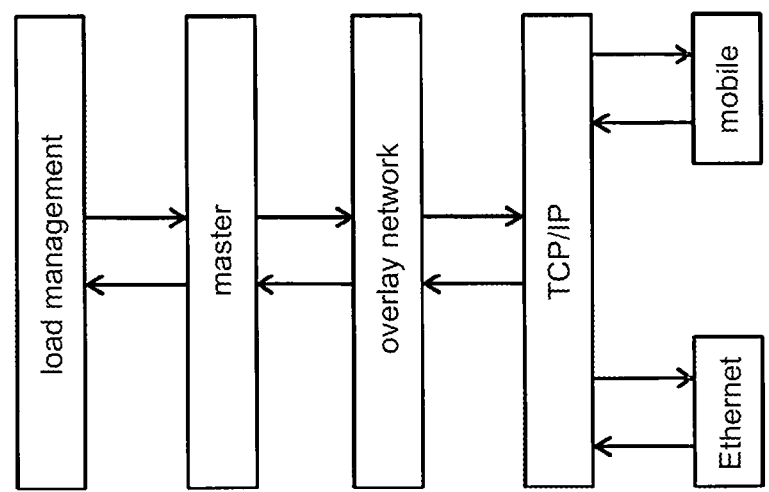
FIG. 2 is a schematic architecture for decentralized load management which enables or assists in the "selection of a master" approach.

FIG. 2 shows, by way of example, an architecture for a decentralized load management which enables or assists the approach "selection of a master".

A program may be used in the charging stations which follows the decentralized approach described here. For example, one and the same program can be executed on a plurality of charging stations since, in this way, each charging station (as a node of a P2P network) is capable of taking on the function of the master.

The program can use different communication paths, for example wireless or wired communication. For example, the charging stations can communicate with one another over the Ethernet 201 and/or over a mobile radio network 202 (for example GSM, UMTS, LTE, etc.) by TCP/IP 203.

An overlay network 204 which manages the logic network above the IP network is illustrated above the TCP/IP layer 203 in the protocol architecture shown in FIG. 2.

In a P2P network, a large number of peers (in this example: charging stations) with significant dynamics (changes over time) can be provided. The overlay network 204 can be structured by distributed hash tables. In the example described here, management of the overlay network 204 can be assisted in a configuration phase (also referred to as engineering phase or parameterization) by a central component, i.e. each peer (charging station) in the P2P network is given a complete list of all peers (charging stations) during the configuration of the peer.

On the basis of the list of all of the peers, the selection of the master 205 is performed in each of the charging stations. First, the assumption is made that the lists of peers are consistent. In the case of inconsistent peer lists, these peer lists are synchronized. The master is selected on the basis of a peer ID allocated by the central entity. For example, the charging station which has the lowest peer ID is selected as master.

If a charging station has determined itself as master, it activates a master mode and initializes load management 206, for example by activation of a load management algorithm. The parameters required for this can be established by the central component and can correspond to the parameters of the central load management.

The master operates the same interface callups as in the central case, for example:
  energyRequest( ) for new queries,
  sessionEnd( ) for ending a charging operation,
  sessionUpdate( ) for the updating of status values,
  energySet( ) for setting the setpoint value of a charging station.

For the interface callups, for example, corresponding XML messages can be defined and used for the decentralized case.

Figure 3:
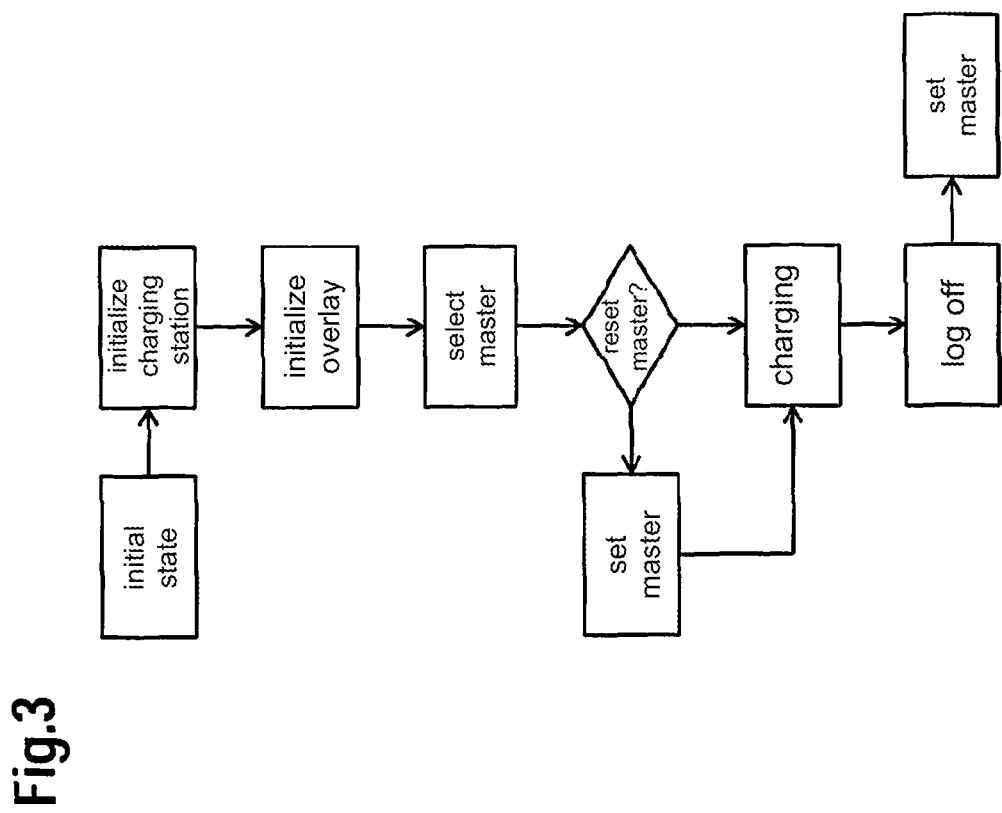
FIG. 3 is an exemplary state diagram for a charging station.

FIG. 3 shows an exemplary state diagram for a charging station. First, a transition is made from an initial state 301 into a state 302 for the initialization of the charging station. In a subsequent state 303, the overlay network is initialized and, in a following state 304, the selection of the master takes place. If the master is selected, the system branches off to a query 305. If the present charging station has selected itself as master, the system branches off to a state 306, and initialization (or conversion) of the present charging station as master takes place. Subsequently, or when the query 305 yields that the present charging station has not been selected as master, the system branches to a state 307 in which the charging station is active (as master or as normal peer). A termination requires a change to a state 308 in which the charging station logs off and transfers to a final state 309 (for example for disconnection or for maintenance of the charging station).

The decentralized load management can initially be parameterized. Before a charging station becomes active in decentralized load management, a connection to the central component takes place. For example, an installer can implement the parameterization of the charging station once the charging station has been installed via a laptop by means of the central component.

For example, a charging station in the case of the central component can log on and receives the peer lists of the available charging stations. The installer can now adjust (set or update) necessary parameters. This type of parameterization is comparable to the scenario of central load management. Groups with capacity restrictions can also be set and charging stations can be assigned to groups (included in groups or deleted from groups). Once the information has been input, the charging station is adjusted by virtue of, for example, all of the parameters for adjustment being summarized in one file and transmitted to the charging station.

Fault Resolution

Fault cases will be listed by way of example in the text which follows and corresponding fault resolution will be proposed for each case.

(a) Failure of the Master

Failure of the master is a critical fault and corresponding fault resolution is necessary for continued function in a decentralized scenario since the load distribution is impossible without a master.

In the event of failure of the master, the function of the master should be taken over by another charging station. The following may be implemented for this:
(i) selection of a backup master and redundant storage of the load distribution prior to failure of the master;
(ii) identification of the failure of the master;
(iii) selection of a new master from among the querying charging stations.

In order not to lose a present load distribution as a result of failure of the master, this present load distribution is stored in a backup master which needs to be predetermined, for example. The backup master can be determined on the basis of its peer ID (for example the second lowest peer ID is used for the backup master).

This approach can be applied similarly for a plurality of backup masters: in order to be able to compensate for multiple failures of masters, a list with a multiplicity of backup masters can be used, wherein a master passes on any message from one charging station to the backup masters as well. It is thus possible to ensure that the state in the master is also replicated in the backup masters.

In this case, it is an option for only the messages and not the complete load distribution information to be passed on. The complete load distribution information can be determined by the backup masters themselves on the basis of the information communicated.

A failure of the master can be detected by the first query of a charging station to which there is no response. Thereupon, the querying charging station contacts the (first) backup master and transmits the query to which there has been no response to the backup master. The backup master demands a so-called "heartbeat" message from the master (i.e. information indicating that the master is still active and can communicate). If the backup master receives the "heartbeat" message from the master, the query from the charging station is not processed, but referred to the actual master (this can also take place by the backup master doing nothing because the backup master assumes that the master will respond to the query from the charging station). If the backup master cannot reach the master either (i.e. in the case of no "heartbeat" message), it is assumed that the master has failed and the backup master activates its master mode and processes the query from the charging station. A further charging station whose query remains without a response from the original master contacts the new master (previously: backup master), which directly processes the query from the charging station.

To initialize the backup master as the new master, the complete state for the load management (list with load distributions) can be transmitted to the backup master.

As an alternative to redundant storage, in order to initialize the backup master as the new master, the complete state for the load management (list with load distributions) can be transmitted to the backup master or the backup master can contact all of the other charging stations and query the state thereof.

(b) Failure of a Charging Station

If a charging station which is not the master fails, it is possible to distinguish between two situations:
(i) the failed charging station did not have an active charging operation;
(ii) the failed charging station was in an active charging operation.

In the first case (i), the failure does not have any effects on the load management and can therefore remain unresolved.

In the second case (ii), the failure of the charging station could have effects on the load management and could therefore require monitoring of charging stations.

It is also possible for the failure of the charging station to have a cause which cannot be discerned from monitoring: for example, it may not be possible to discern whether there is merely a communication problem or whether the charging station has failed. If only the communication to the charging station has failed, the charging station could implement a charging operation unchanged. In this case, the resources allocated to this charging station cannot be redistributed.

One option is not implementing any monitoring of the charging stations, in particular if redistribution of the resources is intended to remain unchanged. Thus, fault resolution for the failure of a charging station can also be omitted depending on the application case.

(c) Reentry of a Previous Master

If a former master becomes active again once it has failed, it may be necessary to ensure that no conflicts and/or inconsistencies occur.

For example, one possibility is to assume that a failure of the master is an indication of further failures. Thus, provision could be made for the former master not to assume its master role again. In order to ensure this, the peer ID of the former master can be changed. For example, the peer ID can be extended by a version number, wherein, for example, the version number is added as a prefix to the peer ID. The selection of the master continues to be based on the lowest peer ID taking into consideration this prefix.

For other charging stations, the former master is either labeled as inactive or, in the case of a new query, this former master responds by updating its peer ID (including the new version number). Thus, it is possible to determine for the querying charging station that the former master is no longer the present master.

(d) Inconsistent Peer Lists

In order to be able to ascertain the master unequivocally over all of the charging stations, the abovementioned peer list is used. Correspondingly, this peer list needs to be kept consistent.

The number of charging stations (for example within a cluster) can be small (including, for example, approximately 32 charging stations). Each charging station stores the peer list with the peer IDs of all other charging stations. The peer list can be parameterized by the central component.

If a charging station is added retrospectively, the peer list is parameterized using the central component. The new charging station receives the updated peer list and identifies all of the charging stations in the network, but the charging stations, at first, do not identify this new charging station. Synchronization of the peer list between the charging stations may be required. Such a synchronization can be implemented in a variety of ways.

For example, provision can be made for the new charging station at first not to be a possible master; this can be ensured, for example, by ascending peer IDs, wherein the new charging station is given the highest peer ID to date and therefore at present can hardly be selected as master.

In order to synchronize the peer lists, the new charging station logs on (for example by a join message) with all other charging stations. On the basis of this logging on, the peer list in each charging station can be updated; the receiver supplements its peer list with the peer ID and the IP address of the new charging station.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:
1. A method for providing electrical energy, comprising:
   communicating a status change from at least one charging station to a charging system;

determining by the charging system a load distribution;

communicating the load distribution from the charging system to the at least one charging station; and providing the electrical energy by the at least one charging station in accordance with the load distribution.

2. The method as claimed in claim 1, wherein the load distribution is determined on the basis of at least one secondary condition and a number of connected or active charging stations.

3. The method as claimed in claim 2, wherein the at least one secondary condition includes at least one of a preset maximum permissible capacity, a weighting factor or a prioritization, and a maximum permissible charging current per at least one of each charging operation, base station or electric vehicle.

4. The method as claimed in claim 3, wherein the preset maximum permissible capacity includes at least one of
- a preset maximum permissible capacity of the charging station,
- a preset maximum permissible capacity of a cable,
- a preset maximum permissible capacity of a transformer,
- a preset maximum permissible capacity of a distribution substation,
- a preset maximum permissible capacity in accordance with an agreement or contract,
- a preset maximum permissible capacity of an electric vehicle,
- a preset maximum permissible capacity of an energy source,
- a preset maximum permissible capacity of a virtual power plant corresponding to an aggregation of a multiplicity of energy sources.

5. The method as claimed in claim 4, wherein the charging system is a central charging system.

6. The method as claimed in claim 4, wherein the charging system is provided by a master charging station.

7. The method as claimed in claim 6, wherein the master charging station is detected using an identifier.

8. The method as claimed in claim 6, further comprising implementing at least one of configuration and parameterization of the master charging station using a central component.

9. The method as claimed in claim 8, further comprising determining at least one backup master charging station.

10. The method as claimed in claim 9,
- further comprising communicating any status change from the master charging station to the at least one backup master charging station, and
- wherein the at least one backup master charging station determines the load distribution based on the status change.

11. The method as claimed in claim 9, wherein the master charging station communicates the determined load distribution to the at least one backup master base station.

12. The method as claimed in claim 11, further comprising activating a next backup master charging station upon a failure of the master charging station.

13. The method as claimed in claim 12, wherein a reactivated former master charging station is initially not used again as the master charging station.

14. The method as claimed in claim 4,
- wherein the charging system is decentralized from each charging station, and
- said method further comprises adjusting electrical energy output by each charging station based on estimations which are ascertained owing to information or messages from other charging stations.

15. The method as claimed in claim 14, wherein at least one electric vehicle is charged using the electrical energy provided.

16. An apparatus for providing electrical energy, comprising:
- a processing unit programmed to perform operations including communicating a status change to a charging system to enable a load distribution to be ascertained by the charging system and the electrical energy provided in accordance with the load distribution.

17. The apparatus as claimed in claim 16, wherein the apparatus is a charging station that charges an electric vehicle.

* * * * *